(12) United States Patent
Nagai

(10) Patent No.: US 8,422,052 B2
(45) Date of Patent: Apr. 16, 2013

(54) PRINTING SYSTEM AND HOST APPARATUS

(75) Inventor: Keiji Nagai, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 1113 days.

(21) Appl. No.: 11/667,700

(22) PCT Filed: Sep. 11, 2006

(86) PCT No.: PCT/JP2006/018435
§ 371 (c)(1),
(2), (4) Date: May 14, 2007

(87) PCT Pub. No.: WO2007/032500
PCT Pub. Date: Mar. 22, 2007

(65) Prior Publication Data
US 2008/0094655 A1    Apr. 24, 2008

(30) Foreign Application Priority Data

Sep. 13, 2005 (JP) .................................. 2005-265235
Aug. 2, 2006 (JP) .................................. 2006-210632

(51) Int. Cl.
*G06F 3/12* (2006.01)
*G06F 15/16* (2006.01)
*G06K 15/00* (2006.01)
*G01D 9/42* (2006.01)

(52) U.S. Cl.
USPC ......... 358/1.15; 358/1.1; 358/1.13; 358/1.14; 346/107.3; 709/247

(58) Field of Classification Search ......................... None
See application file for complete search history.

(56) References Cited

U.S. PATENT DOCUMENTS 6,182,219 B1 * 1/2001 Feldbau et al. ............... 713/176
7,313,699 B2 * 12/2007 Koga ............................ 713/170
2002/0032703 A1 3/2002 Gassho et al.
2002/0131593 A1 9/2002 Parry
2005/0183141 A1 * 8/2005 Sawada .......................... 726/16

FOREIGN PATENT DOCUMENTS

| JP | 11 301058 | 11/1999 |
|---|---|---|
| JP | 2002-14788 | 1/2002 |
| JP | 2002 259341 | 9/2002 |
| JP | 2003 58290 | 2/2003 |
| JP | 2003-271322 | 9/2003 |
| JP | 2004 289302 | 10/2004 |

OTHER PUBLICATIONS

Extended European Search Report issued Sep. 16, 2010, in Patent Application No. 06810227.6.
Office Action issued Aug. 9, 2011, in Japanese Patent Application No. 2006-210632.

* cited by examiner

*Primary Examiner* — Steven Kau
*Assistant Examiner* — Marcus T Riley
(74) *Attorney, Agent, or Firm* — Oblon, Spivak, McClelland, Maier & Neustadt, L.L.P.

(57) ABSTRACT

A host apparatus used in a printing system includes the host apparatus and an image forming apparatus, and the image forming apparatus receives print data and authentication information from the host apparatus so as to perform authentication operation referring to the authentication information. The host apparatus includes: an authentication information obtaining unit configured to obtain login authentication information from an operating system of the host apparatus as the authentication information, wherein the login authentication information obtained from the operating system is one entered when a user logs in to the host apparatus or to a network domain; and an authentication information sending unit configured to send the login authentication information to the image forming apparatus as the authentication information.

5 Claims, 10 Drawing Sheets

(USER INFORMATION)

FIG.7

(LINE NUMBER)

```
(1)  @PJL JOB
(2)  @PJL SET JOBNAME="MEMO PAD"
(3)  @PJL SET QTY=1
(4)  @PJL SET DUPLEX=OFF
(5)  @PJL SET STAPLE=OFF
(6)  @PJL SET PUNCH=OFF
(7)  @PJL SJOB
(8)  @PJL SET UID="User"
(9)  @PJL SET PASSWORD="pass"
        ...
```

(DESCRIPTION EXAMPLE OF PRINT JOB DATA)

(PRINT SETTING DIALOG BOX)

(PRINTER SETTING DIALOG BOX)

(PRINT SETTING DIALOG BOX)

PRINTING SYSTEM AND HOST APPARATUS

TECHNICAL FIELD

The present invention relates to a printing system including an image forming apparatus and a host apparatus. When a user authentication print mode is selected, the host apparatus sends print data and authentication information including a user ID and a password to the image forming apparatus. As to a print job for which the user authentication mode is specified, the image forming apparatus performs authentication operation referring to the authentication information received from the host apparatus so as to perform printing operation for the print data according to the result of the authentication.

BACKGROUND ART

In conventional techniques, authentication using a user ID and a password is generally performed when launching an operating system or when connecting to a network for improving security.

On the other hand, Japanese Laid-Open Patent application No. 11-301058 discloses a printing system including a user authentication printing function for specifying a user who is permitted to use a printing function of an image forming apparatus by adding user authentication information such as a user ID to print data from a printer driver. In such printing system, printing can be executed when the user authentication information that is added to the print data when printing is started agrees with user authentication information that is entered into the image forming apparatus after the print data is sent to the image forming apparatus.

However, according to such a conventional apparatus, although the user can freely specify a user ID and a password, since the user needs to enter the user ID and the password every time when printing is necessary, it is burdensome for the user.

The image forming apparatus can record information of user IDs as a printing history. But, since one user may use a plurality of user IDs, the history is recorded as though a plurality of users printed copies although only one user printed the copies actually.

The present invention is contrived in view of the above-mentioned problems, and an object of the present invention is to provide techniques that can enable users to use a user authentication printing mode easily.

DISCLOSURE OF THE INVENTION

At least one aspect of one or more embodiments of the present invention relates to a host apparatus used in a printing system including the host apparatus and an image forming apparatus, wherein the image forming apparatus receives print data and authentication information from the host apparatus so as to perform authentication operation referring to the authentication information, the host apparatus including:

an authentication information obtaining unit configured to obtain login authentication information from an operating system of the host apparatus as the authentication information, wherein the login authentication information obtained from the operating system is one entered when a user logs in to the host apparatus or to a network domain; and an authentication information sending unit configured to send the login authentication information to the image forming apparatus as the authentication information.

The host apparatus may further include:

a user interface unit configured to display a dialog screen for entering print modes and the authentication information, wherein the authentication information obtaining unit obtains the login authentication information from the operating system when a user authentication print mode is selected on the screen and the authentication information is not entered on the screen.

The login authentication information obtained as the authentication information may be set to be unchangeable on the dialog screen.

In addition, the authentication information may include a user ID and a user password, the login authentication information may include a login ID and a login password, and the authentication information obtaining unit obtains the login ID and the login password from the operating system, the host apparatus may further include:

a user interface unit configured to display a dialog screen, for entering the authentication information, showing the login ID as the user ID, wherein, when the login ID is changed on the dialog screen, the authentication information obtaining unit deletes the obtained login password.

According to the present invention, since login authentication information is automatically obtained as the authentication information, effort of the user when using the user authentication print mode can be largely reduced.

BRIEF DESCRIPTION OF DRAWINGS

The invention is illustrated by way of example, and not by way of limitation in the figures of the accompanying drawings in which like reference numerals are used to refer to similar elements.

FIG. 7 shows a description example of print job data;

BEST MODE FOR CARRYING OUT THE INVENTION

In the following, embodiments of the present invention are described in detail with reference to the figures.

Figure 1:
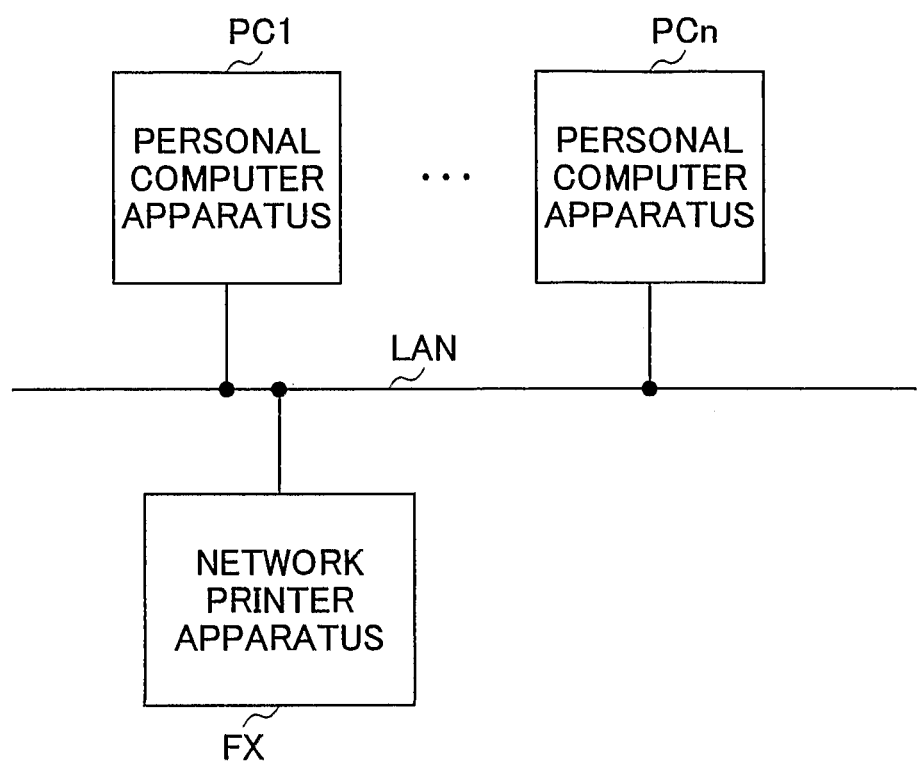
FIG. 1 is a block diagram showing a printing system of an embodiment of the present invention.

FIG. 1 shows a printing system of an embodiment of the present invention.

As shown in the figure, the printing system includes a personal computer apparatus PC1, . . . , a personal computer apparatus PCn, and a network printer apparatus FX. A local area network LAN is connected to the personal computer apparatuses PC1-PCn and to the network printer apparatus FX.

The network printer apparatus FX provides a network printing function via the local area network LAN to the personal computer apparatuses PC1-PCn. Software such as a printer driver for using the network printer function is installed in each of the personal computer apparatuses PC1-PCn.

In addition, so-called operating system is installed in each of the personal computer apparatuses PC1-PCn as a basic system, and the printer driver and the like is executed under the control of the operating system.

The operating system performs login authentication (user authentication) for authenticating a user for using the personal computer apparatus. Also, the operating system performs login authentication (user authentication) that is performed when login to a network domain is performed by a user using the local network LAN. Authentication information for login authentication for each case includes a user ID and a password that are held in the operating system.

Figure 2:
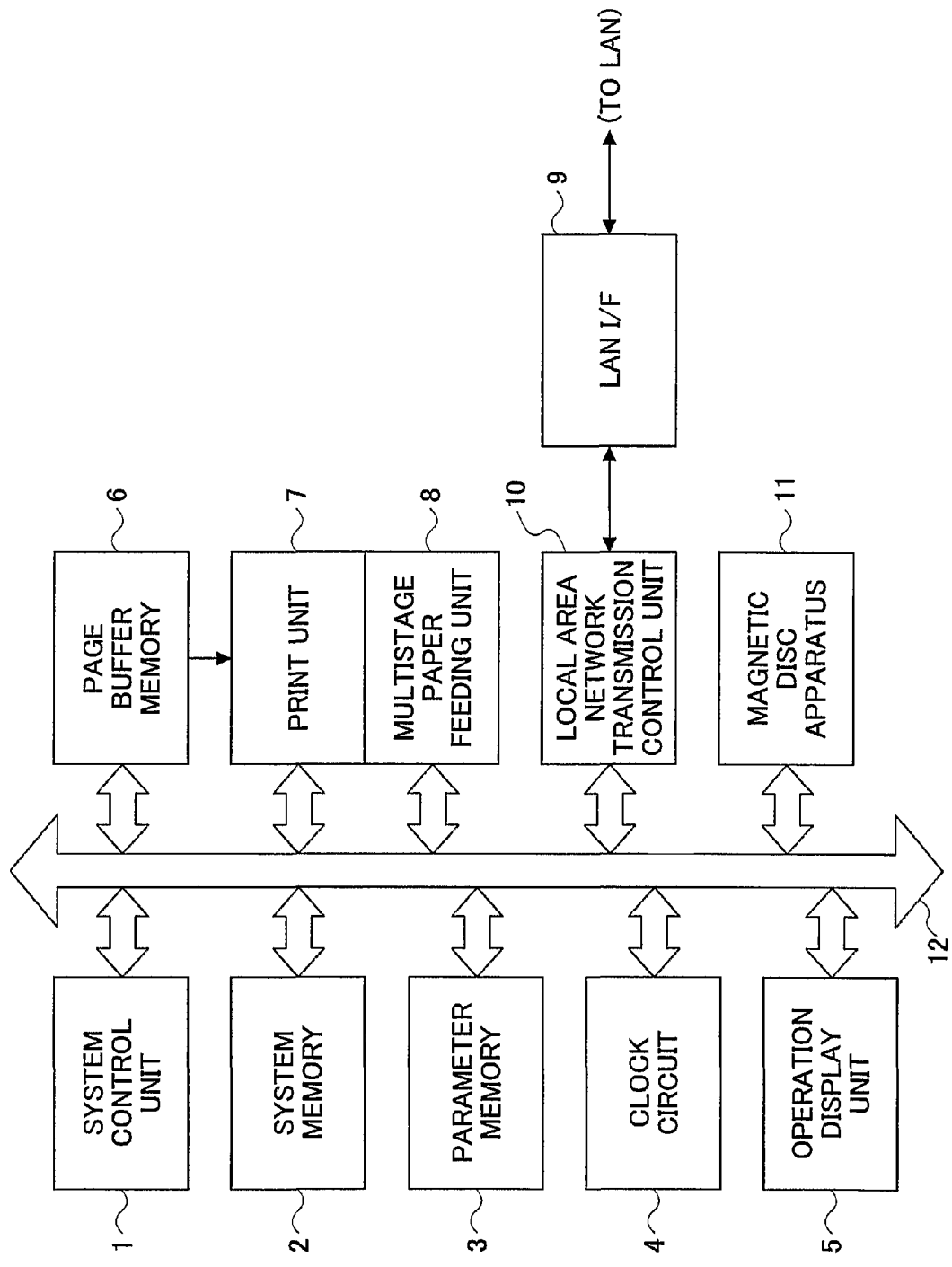
FIG. 2 is a block diagram showing an example of a configuration of a network printer apparatus FX.

FIG. 2 shows an example of a configuration of the network printer apparatus FX. As shown in the figure, the network printer apparatus FX includes a system control unit 1, a system memory 2, a parameter memory 3, a clock circuit 4, an operation display unit 5, a page buffer memory 6, a print unit 7, a multistage paper feeding unit 8, a local area network interface circuit 9, a local area network transmission control unit 10, and a magnetic disc apparatus 11.

In the figure, the system control unit 1 is for performing operation control for each unit of the network printer apparatus FX, paper feed control, print control, control for communication with an external apparatus via an external communication unit, and various data processing such as user interface processing when the user operates the network printer apparatus FX. The system memory 2 is for storing various control programs executed by the system control unit 1 and forming a work area for the system control unit 1. The parameter memory 3 is for storing various information specific to the network printer apparatus FX. The clock circuit 4 is for outputting current time information and the like. The operation display unit 5 forms a user interface for the user to operate the network printer apparatus FX.

The page buffer memory 6 is for forming a frame memory for storing print data of one page. The print unit 7 is for reading out print data from the frame memory formed by the page buffer memory 6 so as to print an image on a paper. In addition, the print unit 7 is provided with the multistage paper feeding unit 8 including a plurality of trays each including papers so as to properly select a kind of papers to be used by the print unit 7 as a recording paper. As the kinds of papers included in the trays, there are A4 portrait, A4 landscape, A5 portrait, A5 landscape and A3 portrait.

The local area network interface circuit 9 is for connecting the network printer apparatus FX to the local area network LAN. The local area network transmission control unit 10 is for executing communication control processing for various protocol suites for communicating various data with other data terminal apparatuses.

The magnetic disc apparatus 11 is for storing print data and the like. By using the magnetic disc apparatus 11, a document box function can be realized for storing print job data for each user, for example.

The system control unit 1, the system memory 2, the parameter memory 3, the clock circuit 4, the operation display unit 5, the page buffer memory 6, the print unit 7, the multistage paper feeding unit 8, the local area network transmission control unit 10, and the magnetic disc apparatus 11 are connected to the internal bus 12, so that data exchange among these is performed mainly via the internal bus 12.

Figure 3:
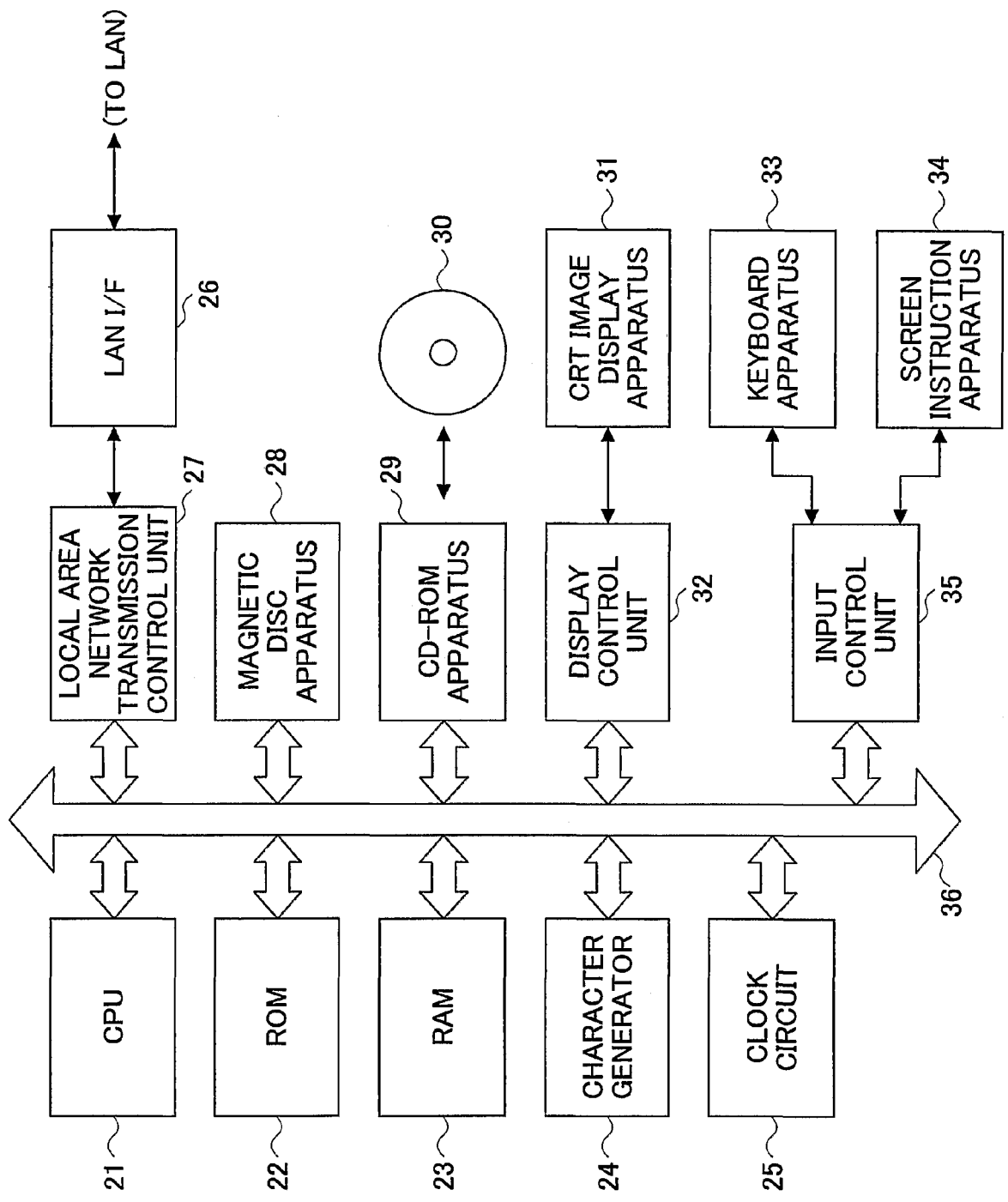
FIG. 3 is a block diagram showing a configuration example of a personal computer apparatus PC (PC1-PCn)

FIG. 3 shows a configuration example of the personal computer apparatus PC (PC1-PCn). The personal computer apparatus PC includes a CPU (central processing unit) 21, a ROM (read only memory) 22, a RAM (random access memory) 23, a character generator 24, a clock circuit 25, a local area network interface circuit 26, a local area network transmission control unit 27, a magnetic disc apparatus 28, a CD-ROM apparatus 29, a CRT image display apparatus 31, a display control unit 32, a keyboard apparatus 33, a screen instruction apparatus 34 and an input control unit 35.

In the figure, the CPU (central processing unit) 21 is for performing operation control of the personal computer apparatus PC. The ROM (read only memory) 22 is for storing a program executed by the CPU 21 when launching and necessary data and the like. The RAM (random access memory) 23 is for forming a work area and the like of the CPU 21.

The character generator 24 is for generating display data of graphic characters. The clock circuit 25 is for outputting current date and time information. The local area network interface circuit 26 is for connecting the personal computer apparatus PC to the local area network LAN. The local area network transmission control unit 27 is for executing communication control processing for various protocol suites for communicating various data with other data terminal apparatuses via the local area network LAN.

The magnetic disc apparatus 28 is for storing various data such as various application programs, work data, file data, and image information data. The CD-ROM apparatus 29 is for reading data from a CD-ROM 30 that is an exchangeable recording medium. The CRT image display apparatus 31 is for displaying a screen for operating the personal computer apparatus PC. The display control unit 32 is for controlling display information to be displayed on the CRT image display apparatus 31.

The keyboard apparatus 33 is used for the user to enter information into the personal computer apparatus PC. The screen instruction apparatus 34 is for performing operation such as instructing an arbitrary point on the CRT screen display apparatus 31. The input control unit 35 is for receiving and capturing input information from the keyboard apparatus 33 and the screen instruction apparatus 35.

The CPU 21, the ROM 22, the RAM 23, the character generator 24, the clock circuit 25, the local area network transmission control unit 27, the magnetic disc apparatus 28, the CD-ROM apparatus 29, the display control unit 32 and the input control unit 35 are connected to the internal bus 36, so that data exchange among these components is performed mainly via the internal bus 35.

Figure 4:
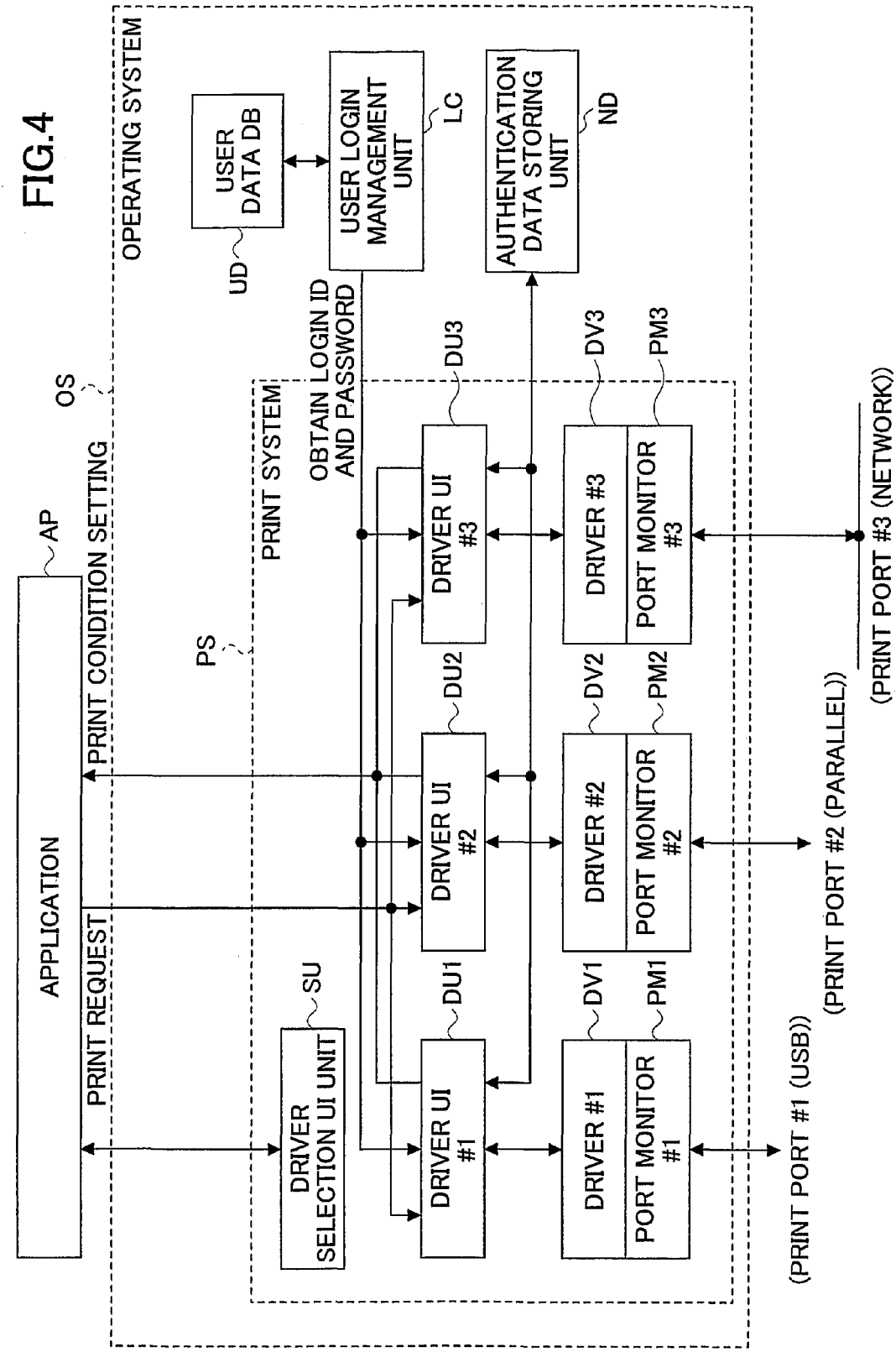
FIG. 4 is a block diagram showing a configuration example relating to print control in the personal computer apparatus PC (PC1-PCn)

FIG. 4 shows a configuration example relating to print control in this embodiment in the personal computer apparatus PC (PC1-PCn). The figure shows a case where a USB port, a parallel port, and a network port are provided as three printing ports (physical connection ports).

An application AP having a printing function (a document generation application, for example) sends a print job to a printer connected to a printing port using a print system PS implemented in the operating system OS.

As shown in the figure, the operating system OS includes a user data DB, a user login management unit LC, an authentication data storing unit ND and the print system PS. The print system PS includes a driver selection user interface unit SU, driver user interfaces DU1-DU3, drivers DV1-DV3, and port monitors PM1.

In the print system PS, the driver selection user interface unit SU displays a screen for the user to select a printer driver corresponding to a printing port, so that any one of a driver user interface is selected from the driver user interface DU1 of the USB port, the driver user interface DU2 of the parallel port, and the driver user interface DU3 of the network port. In addition, the driver selection user interface unit SU receives a print request from the application AP and sends a print condition setting to the application AP.

The driver DV1 is a printer driver for processing print data when the USB port is used. The port monitor PM1 is for sending and receiving data to/from a printer (not shown in the figure) connected to the USB port and monitoring printer connection statuses and the like.

The driver DV2 is a printer driver for processing print data when the parallel port is used. The port monitor PM2 is for sending and receiving data to/from a printer (not shown in the figure) connected to the parallel port and monitoring printer connection statuses and the like.

The driver DV3 is a printer driver (network-capable printer driver) for processing print data when the network port is used. The port monitor PM3 is for sending and receiving data to/from the network printer apparatus FX connected to the network port and monitoring printer connection statuses and the like.

When the user login management unit LC receives a request for obtaining a login ID and a password from the driver user interface (DU1, DU2 or DU3), the user login management unit LC obtains the login ID and the password of the user who is currently logging in from the user database UD that stores user information of a plurality of users of the personal computer apparatus PC, and sends the login ID and the password to the driver user interface that sends the request.

The driver user interface (DU1, DU2, DU3) stores the login ID and the password in the authentication data storing unit ND. Then, after that, when it becomes necessary to refer to the login ID and the password of the use who is currently logging in, the login ID and the password stored in the authentication data storing unit ND are obtained.

Figure 5:
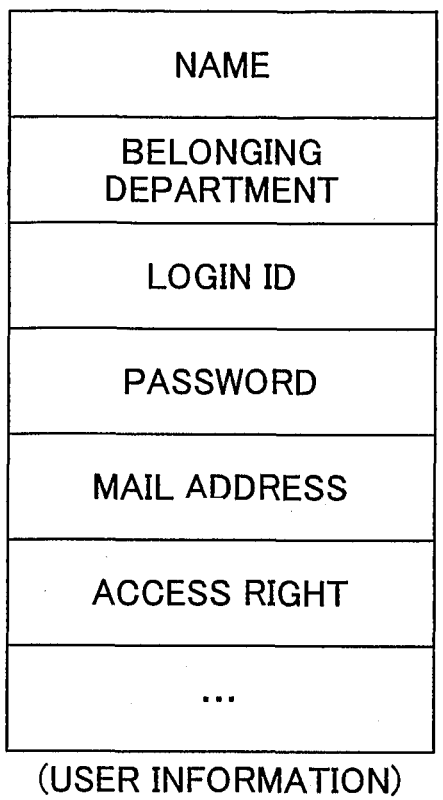
FIG. 5 shows an example of user information.

FIG. 5 shows an example of user information.

This user information is prepared for each login user, and includes a name of the user, belonging department of the user, login ID of the user, password registered for the user, a mail address of the user, access right for the user (general user, management user, for example).

Figure 6:
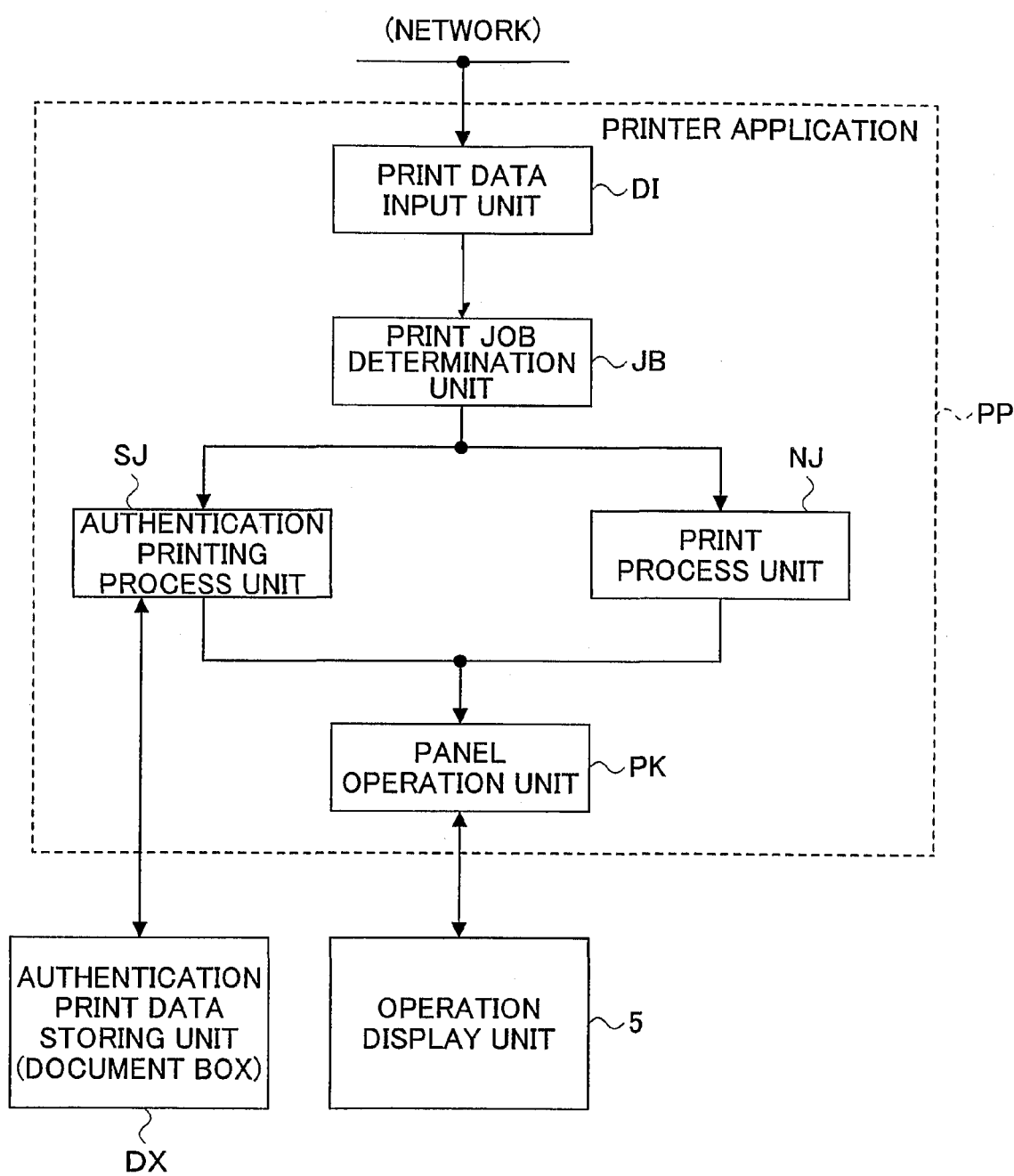
FIG. 6 is a block diagram showing a schematic configuration of a printer application of the network printer apparatus FX.

FIG. 6 shows a schematic configuration of the printer application of the network printer apparatus FX.

This printer application PP includes a print data input unit D1, a print job determination unit JB, an authentication printing process unit SJ, a print process unit NJ, and a panel operation unit PK. The print data input unit D1 is for receiving data of a print job via the local area network LAN, the print job determination unit JB is for determining whether the print job input by the print data input unit DI is an after-mentioned user authentication print mode or a normal print job. The authentication printing process unit SJ is for processing a print job of the user authentication print mode. The print process unit NJ is for executing print processing for the normal print job and for the user authentication print mode. The panel operation unit PK is for performing user interface processing to the operation display unit 5.

The authentication print process unit SJ stores print job data of the user authentication print mode in the authentication print data storing unit DX provided in the magnetic disk apparatus 11. The authentication print data storing unit DX is formed by using a function of a document box.

FIG. 7 shows a description example of print job data.

The first line indicates start of the print job. The second line specifies a job name. The third line specifies a number of print copies. The fourth line specifies ON/OFF of duplex printing (OFF in this case), the fifth line specifies ON/OFF of staple processing (OFF in this case), and the sixth line specifies ON/OFF of punch processing (OFF in this case).

The seventh line is for specifying the user authentication print mode, and the eighth line is for reporting a user ID. The ninth line is for reporting a password. After the line, print data follows.

Therefore, when the print job determination unit JB finds a line of "@PJL SJOB", the print job determination unit JB determines that the print job data is for the user authentication print mode. In other cases, the print job determination unit JB determines the print job data to be for a normal print job.

The user ID and the password included in the print job data are stored in the authentication print data storing unit DX with print data and is used for user authentication.

In this embodiment, the user authentication print mode can be set. In this user authentication print mode, the personal computer apparatus (PC1-PCn) sends user authentication information and print data to the network printer apparatus FX via the local area network LAN.

When the network printer apparatus FX receives a print job of the user-authentication print mode, the network printer apparatus FX stores the print job in a document box. For example, the network printer apparatus FX stores the received user authentication information and print data in a document box 001.

The user who designated the printing goes to the network printer apparatus FX, and operates the operation display unit 5 so as to be able to call the document box 001 and instruct execution of a print job or delete the print job.

Since the print job stored in the called document box 001 is for the user authentication print mode, the network printer apparatus FX displays a guidance on the operation display unit 8 for requesting the user to input user authentication information, namely, a user ID and a password in this case.

The user inputs the user ID and the password following the displayed guidance.

After the user enters the user ID and the password, the network printer apparatus FX obtains user authentication information (user ID and password) stored in the document box 001, and compares them with the entered information to check whether they are the same.

When they are the same, the user authentication succeeds, so that the network printer apparatus FX prints the print data stored in the document box 001 or deletes the print data stored in the document box 001. Operation in user authentication print mode is described so far.

Figure 8:
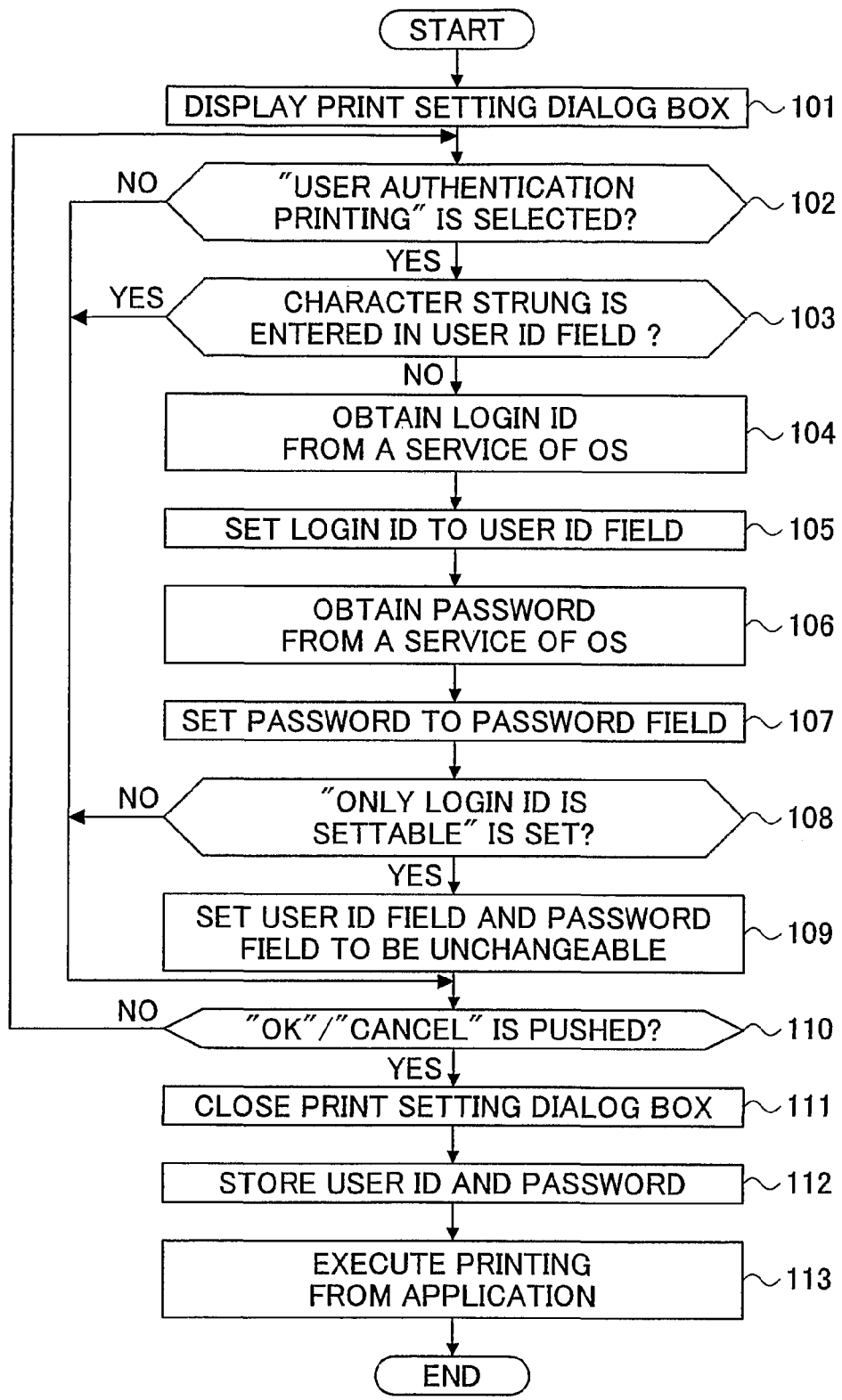
FIG. 8 is a flowchart showing an example of a part of processes of the printer system PS in the personal computer apparatus (PC1-PCn)

FIG. 8 shows an example of a part of processes of the printer system PS in the personal computer apparatus (PC1-PCn) performed when the user instructs printing operation to the personal computer apparatus (PC1-PCn).

Figure 9:
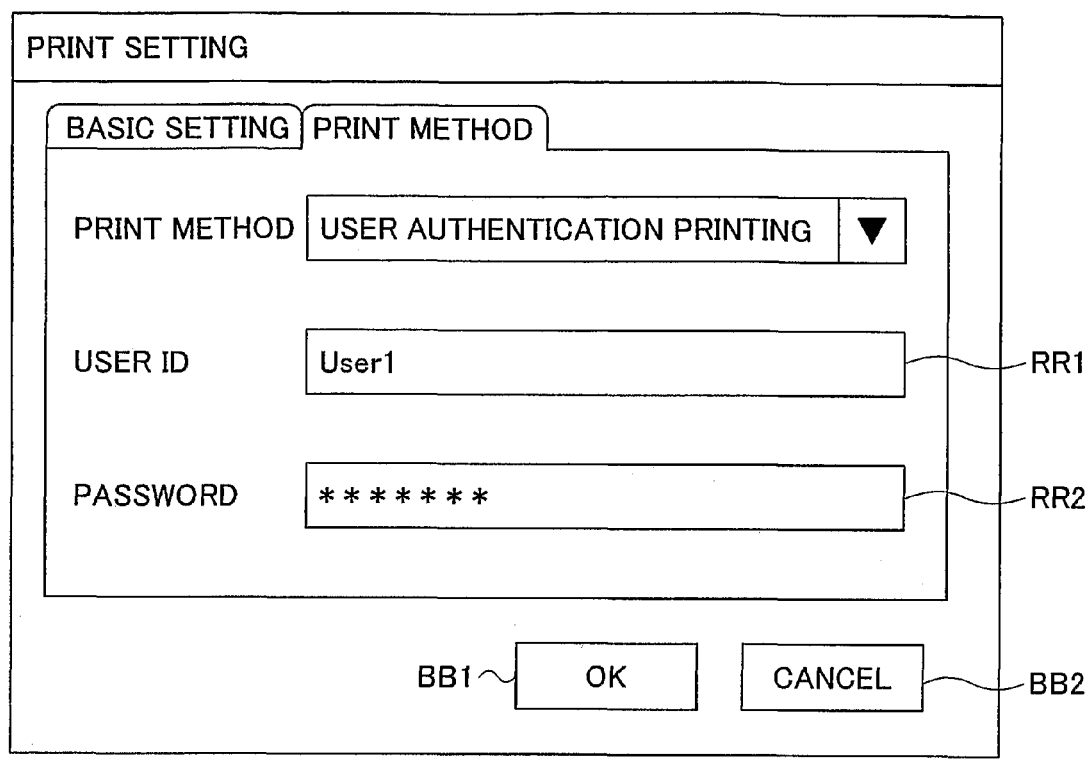
FIG. 9 is a schematic diagram showing an example of a print setting dialog box.
Figure 10:
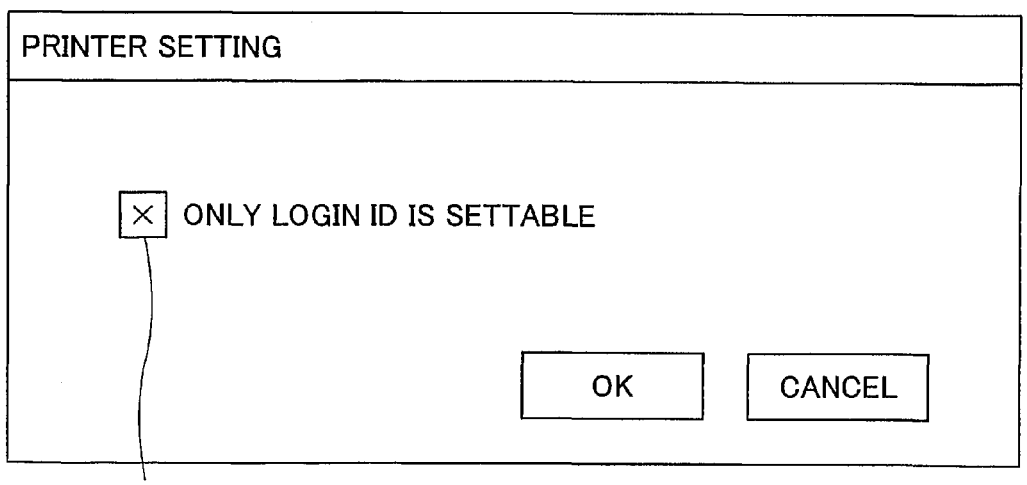
FIG. 10 is a schematic diagram showing an example of printer setting.

When the user specifies the printing operation, the printer system PS displays a print setting dialog box shown in FIG. 9 first (process 101) which is displayed by the driver interface unit. Then, the printer system PS checks whether "user authentication print" is specified as a print method in the print setting dialog box (determination 102).

When the result of the determination 102 is YES, the printer system PS checks whether a character string is entered in an entry field RR1 of user ID in the print setting dialog box (determination 103). When the result of the determination 103 is NO, the printer system PS obtains a login ID of the current user from the user login management unit LC of the operating system OS (process 104). Then, the printer system PS sets the login ID in the entry field RR (process 105). Then, the printer system PS obtains a password of the user from the user login management unit LC of the operating system OS (process 106), and sets the obtained password to the entry field RR2 of the password (process 107).

Figure 11:
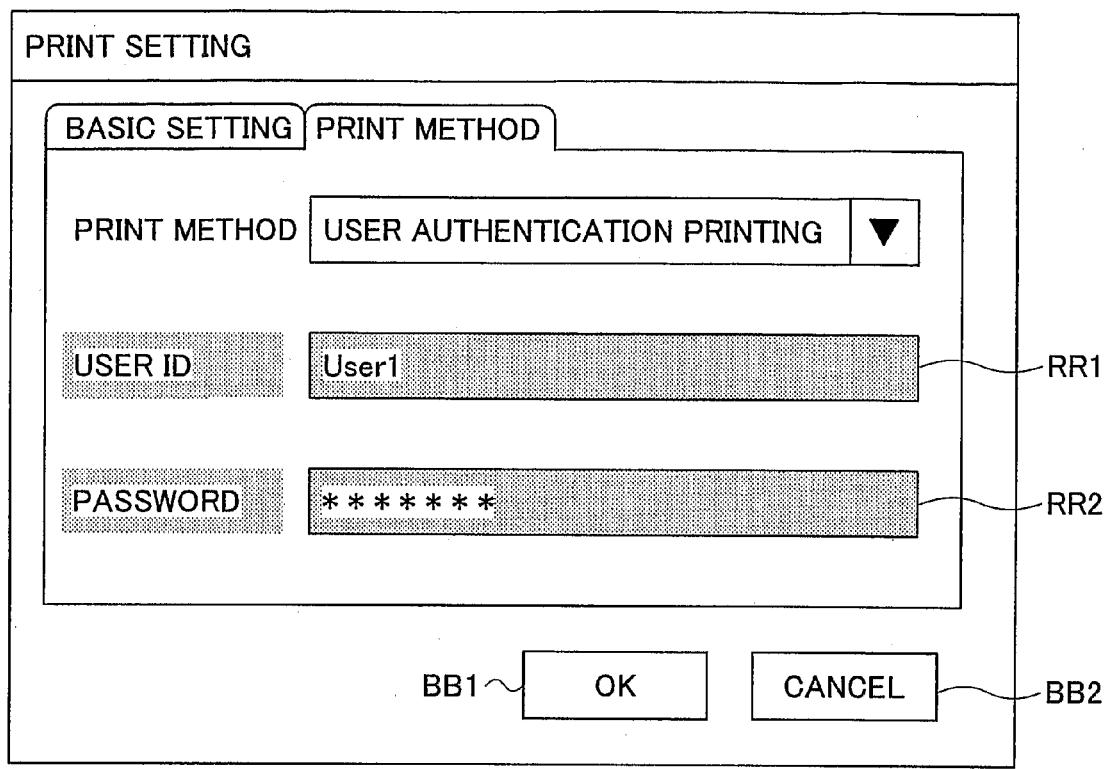
FIG. 11 is a schematic diagram showing another example of the print setting dialog box.

Next, the printer system PS checks whether there is a check mark in a check box RR3 corresponding to "only login ID is settable" in a printer setting dialog box (determination 108). When the result of the determination 108 is YES, the printer system PS grays out display items of user ID and password on the print setting dialog box and grays out entered information of the entry fields RR1 and RR2 so as to set character strings in the entry fields RR1 and RR2 to be unchangeable as shown in FIG. 11 (process 109). By the way, the grayed out parts are shown as shaded areas as shown in FIG. 11.

Next, the printer system PS checks whether "OK" button BB1 or "cancel" button BB2 is pushed in the print setting dialog box (determination 110). When the result of the determination 110 is No, the step returns to the determination 102.

When the result of the determination 110 is YES, the print setting dialog box is closed (process 111), and the printer system PS stores the login ID and the password obtained from the operating system OS stores into the authentication data storing unit ND as a user ID and a password of the user at that time respectively (process 112).

Then, printing operation is started from the application AP (process 113), then, print data and the stored login ID and password are sent to the network printer apparatus FX via the driver.

When the result of the determination 108 is NO or when the result of the determination 103 is Yes, or the result of the determination 102 is No, the process goes to the determination 110, and processes after that are performed.

When information of the user ID entry field RR1 on the print setting dialog box is changed using a keyboard, relationship between the ID and the password is lost. Therefore, entry information of the password entry field RR2 is cleared so as to prompt the user to re-enter a password.

Accordingly, in this embodiment, since the apparatus obtains the login ID and the password from a service (user login management unit LC) of the operating system OS so as to automatically enter them into entry fields of a user ID and a password respectively, effort for inputting data when the user authentication mode is selected can be largely reduced.

In addition, since relationship between the login ID and the password is lost when the login ID is changed using the keyboard, the password entry field is cleared so that the re-entering of the password can be prompted to the user and it can be avoided to forget about entering a password.

In addition, by prohibiting changing the login ID and the password from the keyboard, printing can be performed using a unique user ID by a personal computer apparatus PC to which the user once logs in. Therefore, print management for each user can be performed.

Although a case where a network printer apparatus is used as an image forming apparatus is described in the above embodiment, the present invention can be similarly applied to other image forming apparatuses such as a scanner apparatus, a printer apparatus, a copying machine, a facsimile machine, a multi-functional machine and the like.

The present invention is not limited to these embodiments, but various variations and modifications may be made without departing from the scope of the present invention.

The patent application is based on Japanese Priority Patent Application No. 2005-265235 filed on Sep. 13, 2005, and Japanese Priority Patent Application No. 2006-210632 filed on Aug. 2, 2006, with the Japanese Patent Office, the entire contents of which are hereby incorporated by reference.

The invention claimed is:

1. An information processing apparatus connected to an image forming apparatus that performs an authentication operation referring to authentication information for print data in which an authentication print mode is designated, and that performs a print operation of the print data according to a result of the authentication operation, the information processing apparatus comprising:
   a receiving unit configured to receive information from a user indicating whether to select the authentication print mode;
   an obtaining unit configured to obtain, when the authentication print mode is selected and authentication information has not been entered, login information used when the user logged into an operating system, the authentication information being transmitted to the image forming apparatus to be used for authentication for the print operation;
   a setting unit configured to set the login information obtained by the obtaining unit to be the authentication information;
   a check unit configured to check whether only the login information is settable as the authentication information;
   a control unit configured to control, via a processor, the authentication information set by the setting unit to be unchangeable by the user in response to only the login information being settable as the authentication information; and
   a transmission unit configured to transmit the print data and the authentication information to the image forming apparatus when receiving a transmission instruction of the print data.

2. The information processing apparatus as claimed in claim 1, wherein
   the authentication information includes a password, and
   the obtaining unit obtains, when the authentication print mode is selected and the password has not been entered as the authentication information, a password used when the user logged in to the operating system.

3. The information processing apparatus as claimed in claim 1, wherein
   the authentication information includes a user ID and a password, and
   the information processing apparatus deletes the password included in the authentication information that is the login information set by the setting unit when the user ID included in the authentication information is changed.

4. A non-transitory computer readable medium storing computer readable instructions thereon that when executed by an information processing apparatus, connected to an image forming apparatus that performs an authentication operation referring to authentication information for print data in which an authentication print mode is designated and that performs a print operation of the print data according to a result of the authentication, causes the information processing apparatus to perform a method comprising:
   receiving information from a user indicating whether to select the authentication print mode;
   obtaining, when the authentication print mode is selected and authentication information has not been entered, login information used when the user logged in to an operating system, the authentication information being transmitted to the image forming apparatus to be used for authentication for the print operation;

setting the obtained login information to be the authentication information;
checking whether only the login information is settable as the authentication information;
controlling the authentication information set in the setting step to be unchangeable by the user in response to only the login information being settable as the authentication information; and
transmitting the print data and the authentication information to the image forming apparatus when receiving a transmission instruction of the print data.

5. A method, implemented by an information processing apparatus, connected to an image forming apparatus that performs an authentication operation referring to authentication information for print data in which an authentication print mode is designated and that performs a print operation of the print data according to a result of the authentication, the method comprising:
receiving, at a receiving unit, information from a user indicating whether to select the authentication print mode;
obtaining, at an obtaining unit and when the authentication print mode is selected and authentication information has not been entered, login information used when the user logged in to an operating system, the authentication information being transmitted to the image forming apparatus to be used for authentication for the print operation;
setting, at a setting unit, the obtained login information to be the authentication information;
checking, at a check unit, whether only the login information is settable as the authentication information;
controlling, at a control unit and via a processor, the authentication information set in the setting step to be unchangeable by the user in response to only the login information being settable as the authentication information; and
transmitting, at a transmission unit, the print data and the authentication information to the image forming apparatus when receiving a transmission instruction of the print data.

* * * * *

UNITED STATES PATENT AND TRADEMARK OFFICE
CERTIFICATE OF CORRECTION

| | | |
|---|---|---|
| PATENT NO. | : 8,422,052 B2 | Page 1 of 1 |
| APPLICATION NO. | : 11/667700 | |
| DATED | : April 16, 2013 | |
| INVENTOR(S) | : Keiji Nagai | |

It is certified that error appears in the above-identified patent and that said Letters Patent is hereby corrected as shown below:

On the title page, Item (75), the inventor information is incorrect. Item (75) should read:

--(75) Inventor: Keiji Nagai, Kanagawa (JP)--

On the title page, Item (86), the PCT information is incorrect. Item (86) should read:

--(86) PCT No.: PCT/JP2006/318435

§ 371 (c)(1),
(2), (4) Date: May 14, 2007--

Signed and Sealed this
Sixth Day of August, 2013

Teresa Stanek Rea
*Acting Director of the United States Patent and Trademark Office*